US008167723B1

(12) United States Patent
Hill et al.

(10) Patent No.: US 8,167,723 B1
(45) Date of Patent: May 1, 2012

(54) RECONFIGURABLE GAMING DISPLAY AND SYSTEM

(75) Inventors: Rodney Hill, Las Vegas, NV (US); Shawn G. Quick, Sparks, NV (US); Loren T. Nelson, Reno, NV (US); James W. Morrow, Sparks, NV (US); Robert L. Miodunski, Henderson, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 1342 days.

(21) Appl. No.: 11/463,793

(22) Filed: Aug. 10, 2006

Related U.S. Application Data

(63) Continuation-in-part of application No. 09/967,283, filed on Sep. 28, 2001, now Pat. No. 7,338,372.

(51) Int. Cl.
*A63F 9/24* (2006.01)
*A63F 13/00* (2006.01)

(52) U.S. Cl. ................ 463/42; 463/16; 463/17; 463/18; 463/19; 463/20; 463/25; 463/40; 463/41; 463/43

(58) Field of Classification Search .............. 463/16–20, 463/25, 40–43
See application file for complete search history.

(56) References Cited

U.S. PATENT DOCUMENTS

| | | | | |
|---|---|---|---|---|
| 4,001,807 | A | 1/1977 | Dallimonti | |
| 4,126,851 | A | 11/1978 | Okor | |
| 4,695,053 | A | 9/1987 | Vazquez, Jr. et al. | |
| 5,321,241 | A | 6/1994 | Craine | |
| 5,393,057 | A * | 2/1995 | Marnell, II | 463/13 |
| 5,429,361 | A | 7/1995 | Raven et al. | |
| 5,560,603 | A | 10/1996 | Seelig et al. | |
| 5,643,086 | A | 7/1997 | Alcorn et al. | |
| 5,655,961 | A | 8/1997 | Acres et al. | |
| 5,664,999 | A | 9/1997 | Kurihara | |
| 5,752,882 | A | 5/1998 | Acres et al. | |
| 5,759,102 | A | 6/1998 | Pease et al. | |
| 5,775,993 | A | 7/1998 | Fentz et al. | |
| 5,813,914 | A | 9/1998 | McKay et al. | |
| 5,836,817 | A | 11/1998 | Acres et al. | |

(Continued)

FOREIGN PATENT DOCUMENTS

EP 1004970 A 5/2000

(Continued)

OTHER PUBLICATIONS

IGWB, New "97" Games, Mar. 1997, pp. 1-30.

(Continued)

*Primary Examiner* — Sunit Pandya
(74) *Attorney, Agent, or Firm* — Steptoe & Johnson LLP

(57) ABSTRACT

A gaming system having a reconfigurable gaming machines and reconfigurable gaming displays is disclosed herein. The gaming system comprises one or more gaming machines including one or more reconfigurable video displays where at least one display presents video content for a game of chance and one display presents game information. The gaming machines are capable of receiving and presenting downloadable information on the reconfigurable video displays. The gaming system also includes a configurable display sign associated with the gaming machines. The configurable display sign includes one or more video displays, and the configurable display sign is capable of receiving and presenting downloadable information on the video displays. The gaming system also includes a processor that is in communication with the gaming machines and the configurable display sign. The processor is capable of altering the content displayed on one or more of the reconfigurable video displays and the configurable display sign.

11 Claims, 8 Drawing Sheets

U.S. PATENT DOCUMENTS

| | | | | |
|---|---|---|---|---|
| 5,879,235 | A | 3/1999 | Kaneko et al. | |
| 5,947,824 | A | 9/1999 | Minami et al. | |
| 6,135,884 | A | 10/2000 | Hedrick et al. | |
| 6,142,873 | A | 11/2000 | Weiss et al. | |
| 6,152,824 | A | 11/2000 | Rothschild et al. | |
| 6,159,095 | A | 12/2000 | Frohm et al. | |
| 6,244,958 | B1 | 6/2001 | Acres | |
| 6,254,483 | B1 | 7/2001 | Acres | |
| 6,293,866 | B1 | 9/2001 | Walker et al. | |
| 6,409,602 | B1 | 6/2002 | Wiltshire et al. | |
| 6,454,649 | B1 * | 9/2002 | Mattice et al. | 463/17 |
| 7,008,324 | B1 * | 3/2006 | Johnson et al. | 463/42 |
| 2002/0107072 | A1 * | 8/2002 | Giobbi | 463/42 |
| 2002/0137217 | A1 | 9/2002 | Rowe | |

FOREIGN PATENT DOCUMENTS

| | | | |
|---|---|---|---|
| EP | 1074955 | A | 2/2001 |
| GB | 2042234 | A | 9/1980 |
| GB | 2092796 | A | 7/2001 |
| JP | 020010766 | | 2/2001 |
| WO | W09623288 | A | 8/1996 |

OTHER PUBLICATIONS

IGCA Company History.

Supplementary European Search Report for EP02 77 8385.1-2218 PCT/US0230820, dated Sep. 26, 2006, Applicant Bally Gaming Inc.

* cited by examiner

RECONFIGURABLE GAMING DISPLAY AND SYSTEM

CROSS-REFERENCE TO RELATED APPLICATIONS

This application is a continuation-in-part of U.S. application Ser. No. 09/967,283, filed Sep. 28, 2001 which is hereby incorporated by reference herein in its entirety.

FIELD OF THE INVENTION

This invention relates generally to gaming machines and, more particularly, to gaming machines having the ability to reconfigure entire games, pay tables and artwork.

BACKGROUND

Gaming machines, such as slot machines and video poker machines, are becoming increasingly popular. One reason for their popularity is the variety of games, limited only by one's imagination, which may be implemented on a gaming machine. Another reason for the popularity of gaming machines is the wide range of wager values accepted by the various gaming machines. That is, players who wish to bet 5¢ are accommodated by many gaming machines as well as those who wish to bet $5.00.

For these reasons, casinos typically like to change the games played on their gaming machines frequently. If a game played on a particular machine becomes tiring to game players, casinos may wish to replace that game with another.

Casinos would also like the ability to change the games played on their machines during "slow" periods of relatively little game play so as to attract more players to the machines. For example, on weekdays, it may be advantageous for casinos to have many gaming machines available that have a small minimum bet. On weekends and other busy times, casinos can generate more income by increasing the minimum bet required to play the machines. However, gaming machines are very expensive to manufacture. For this reason, instead of purchasing entirely new machines, casinos frequently retrofit existing machines with new games.

Gaming machines typically have a video display or mechanical reels upon which a primary game is played. Normally, the top box has a glass panel that displays pay tables for the primary game or artwork representative of the theme of the primary game. Sometimes the top box has a video display upon which a secondary game may be played. The belly glass usually has artwork representative of the theme of the primary game.

In order to modify the gaming machine so that players may play a new game on the machine, casino's must replace the chip containing the memory of the primary game and the chip containing the memory of the secondary game, if there is one. In some gaming jurisdictions, a regulatory agent must be present when such an exchange is made.

Further any glass panels containing pay tables or artwork representative of the game must be changed. Otherwise, the theme associated with the belly glass would be inconsistent with the new game. Likewise, pay tables must change to reflect the game theme and allowable bets. Accordingly, this process is very cumbersome, labor-intensive, and expensive. Gaming machine companies must maintain graphic artists and silkscreen artists, on-site, to generate new designs and the new glass. Artists silk-screen the artwork onto the glass via a very carefully controlled process, as the quality of the silkscreen process must be very high. This is because the displays are backlit to allow the light to shine through the glass. Any pinholes or other defects become immediately apparent to the gaming machine player. In addition, the company must devote service personnel to install the fresh glass. Furthermore, during this process, the game is out of commission and, therefore, unable to generate income for the casino. What's more, this process must be done on each machine individually. Thus, changing out games is done less frequently than a slot floor manager might like.

Networked gaming devices are known in the art. Interconnecting a plurality of gaming devices, such as slot machines, via a computer network to a central computer provides many advantages. Such advantages include compiling and auditing data related to the amount of coins received by the gaming devices, the amount paid to players of the devices, and tracking player information. Furthermore, memories located within peripherals contained within the gaming machine may be reprogrammed in order to update the peripherals so that they may detect newly discovered counterfeiting or other cheating schemes. However, there are no gaming machines that may be reconfigured over a network so that entire games, associated paytables and/or artwork may be modified. Furthermore, it is not possible for a casino or player to reconfigure a gaming machine to accommodate for player status or machine location within the casino.

Accordingly, those skilled in the art have long recognized the need for gaming machines wherein games, pay tables and/or artwork may be reconfigured so that casinos may quickly and efficiently change the games played on their machines as frequently as desired without having to perform the tedious and labor-intensive task of changing memory chips and display glass, and all without having to make the machines unavailable for play for long periods of time, so that the casino or its patrons may chose, from a selection of games, as to which game is played on a particular machine. The present invention also fulfills the long recognized need to reconfigure a gaming device to provide new games, pay tables, and/or artwork in response to a player's particular needs or decisions, player status, and/or the casino's gaming player's criteria.

BRIEF SUMMARY

Briefly, and in general terms, the present invention provides a gaming machine wherein games, pay tables and artwork may be reconfigured so that casinos may change the games played on their machines frequently without having to perform the tedious and labor intensive task of changing memory chips and display glass, without having to make the machines unavailable for play for long periods of time, and so that casinos and/or players may chose from a selection of games which game is played on a particular machine.

More particularly, by way of example and not necessarily by way of limitation, the present invention provides a gaming machine comprising a first video display that displays a first game, a second video display that displays pay tables associated with the first game, and a third video display that displays artwork associated with the first game. The three video displays are reconfigurable so that a second game is displayed on the first video display, pay tables associated with the second game are displayed on the second video display, and artwork associated with the second game is displayed on the third video display. Alternatively, or in addition, one of the video displays may display a secondary game. Reconfiguration may take place: automatically, upon the occurrence of a triggering event or in response to a trigger; automatically, at a predetermined time; by a command made by casino personnel; or at the request of a player.

In accordance with the present invention, the changing of a game can be accomplished by downloading the new game and related software, including associated artwork, pay tables, graphics, sound, and the like, from either a CD-ROM, an intranet, the Internet, any attached network, or any other local storage medium contained within the game. As a result, this download changes the appearance and operation of the gaming machine. In other words, complete game themes can be downloaded to the gaming machine including, but not limited to game code, pay table graphics, and player attraction graphics. Alternatively, multiple games may be stored on the local storage media within the gaming machine whereby one may be selected for use on the machine. However, it should be appreciated by one skilled in the art that games may be changed using any method known in the art. In addition, the potential game choices may actually may be intermittently displayed on the screens to attract players.

Thus, casino management can optimize play on the casino floor by rapidly reconfiguring games quickly and inexpensively. A casino can configure machines or the network to change games, paytables, minimum or maximum bets, and the like, at predetermined times, upon the occurrence of certain events, and/or the casino management can do so spontaneously. A plurality of machines may be reconfigured substantially simultaneously or the casino may choose to reconfigure only a single machine. For example, a casino may want to replace the games, associated pay tables and artwork on a plurality of machines with a more popular game, associated pay tables and artwork. Further, the casino may also reconfigure a plurality of machines to raise and lower the minimum bet required. For example, the minimum bet on machines may be $0.05 on weekdays and $5 on weekends. Or, if a busload of senior citizens, for example, unexpectedly enters the casino, the slot floor manager could quickly reconfigure some gaming machines, lowering the minimum bet to $0.05. Alternatively, a predetermined triggering event or trigger may cause the gaming machine, or certain sub-groupings of them, to reconfigure. For example, the gaming machine may lower or raise odds depending on the identity of the player (the network knows the identity of the player if the player inserts his or her game or club card into a card reader, as is known in the art) or the speed at which the game is being played or the amount of the wager. Alternatively, a game change could take place at the request of a patron by the selection of a game title from a multi-game menu. This allows the player to sit at a machine in a specific location within the casino and to also play his game of choice.

Hence, the present invention satisfies a long existing need for a gaming machine wherein games, pay tables and artwork may be reconfigured so that casinos may change the games played on their machines frequently without having to perform the tedious and labor intensive task of changing memory chips and display glass and without having to make the machines unavailable for play for long periods of time so that casino patrons may chose, from a selection of games, which game is played on a particular machine.

In one embodiment, a gaming system having a reconfigurable gaming machines and reconfigurable gaming displays is disclosed herein. The gaming system comprises one or more gaming machines including one or more reconfigurable video displays where at least one display presents video content for a game of chance and one display presents game information. The gaming machines are capable of receiving and presenting downloadable information on the reconfigurable video displays. The gaming system also includes a configurable display sign associated with the gaming machines. The configurable display sign includes one or more video displays, and the configurable display sign is capable of receiving and presenting downloadable information on the video displays. The gaming system also includes a computer that is in communication with the gaming machines and the configurable display sign. The computer is capable of altering the content displayed on one or more of the reconfigurable video displays and the configurable display sign.

In another embodiment, the gaming system comprises a configurable display sign that includes one or more video displays. The configurable display sign receives and presents downloadable information on the video displays. The gaming system also includes one or more gaming machines, wherein the gaming machines are associated with the configurable display sign. The gaming system also includes a system host in communication with the configurable display sign, wherein the system host is capable of altering the content displayed on the configurable display sign.

In yet another embodiment is directed to a configurable sign that is associated with one or more gaming machines. The configurable sign includes a first surface having one or more video displays, wherein at least one video display is capable of receiving and presenting downloadable information regarding the associated gaming machines. The configurable sign is also in communication with a computer that is capable of altering the content displayed on the video displays.

These and other objects and advantages of the invention will become apparent from the following, more detailed description, when taken in conjunction with the accompanying drawings of illustrated embodiments.

DETAILED DESCRIPTION OF THE INVENTION

Figure 1:
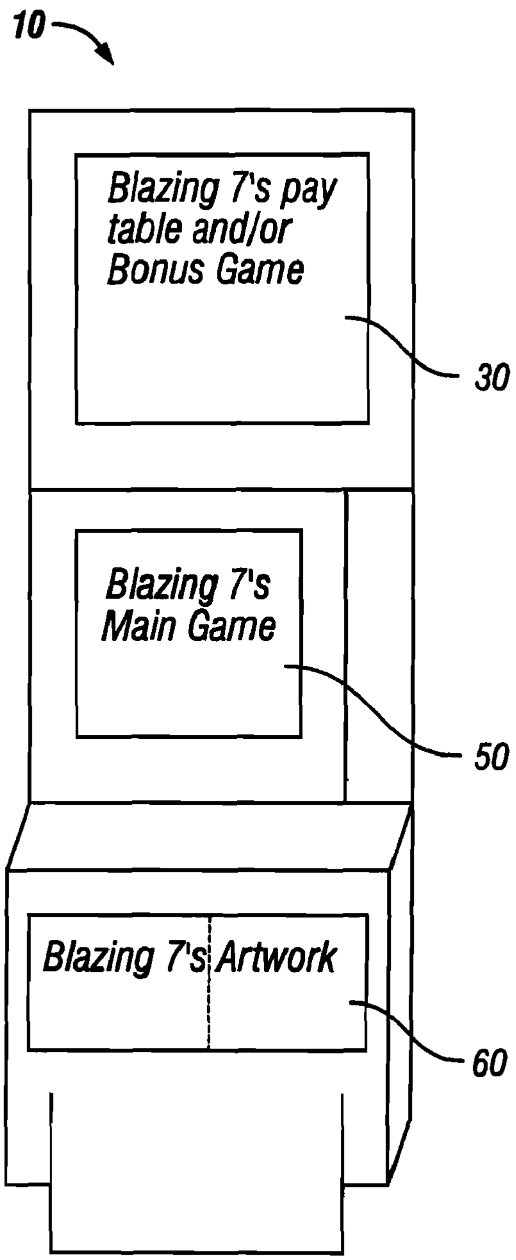
FIG. 1 is a front view of a gaming machine.

Referring now to the drawings, wherein like reference numerals denote like or corresponding parts throughout the drawing figures and more particularly to FIG. 1, a gaming machine 10, in accordance with a preferred embodiment, is illustrated. The gaming machine has a top display area 30, middle display area 50, and bottom display area 60. A button deck for user input is arranged below the central screen 50. The top display area 30 is typically intended to appear in size and presentation as the "top award glass" traditionally used in slot machines to present the pay table. Preferably, the top display area 30 may also be used to display a bonus game.

The middle display area 50 provides the traditional game display. Typically, spinning reels, poker, keno or any number of games are presented in the middle display area 50. The bottom display area 60 fills the area traditionally associated with the "belly glass" in a gaming machine and showcases artwork representative of the theme of the game being played in the middle screen 50. The bottom display area generally is comprised of two video displays arranged in a unique way so that the two screens have the look and feel of a single piece of glass, thus appearing to be a single, large odd-shaped display. Preferably, two 10.5 inch flat panel LCD's are placed next to one another. The area where the two displays meet is as small as possible. A single piece of glass is placed over both displays to give it the outward appearance of a single solid piece of glass. One important enabling point is the use of a PC architecture within the game and the use of the Microsoft NT or XP operating system. Since standard PC technology is preferably used, a PCI plug-in card for the PC may support four monitors simultaneously. Added to the Accelerated Graphics Port "AGP" card, which the game platform preferably runs, the game platform provides the option of using five monitors. The Microsoft operating system recognizes the multiple monitors and enables them to be driven with differing graphics. Two video outputs drive the 'belly glass' LCD displays, the middle display uses the AGP output and a single video output drives a 18" LCD in the top glass area. This leaves one extra video display that may be used for any purpose.

Thus, the gaming machine retains the basic look and feel of the traditional gaming machine. There is a top glass 30 area for displaying pay table information, bonus play information, or player attraction content. There is a central main screen area 50 for active game play. Finally, there is a lower attract mode area for display 60 for the traditional belly glass, game features or advertising information. Note that all displays may include touchscreen input from the user. It should be appreciated by one skilled in the art that any number of screens may be used, in accordance with the present invention. Moreover, any content may be displayed on any of the screens.

By replacing the traditional top glass and belly glass with video displays, the need for changing top and belly glass each time a game is changed is eliminated, thus saving time and money. Furthermore, as casino patrons interact with all three screens in the preferred embodiment, a new type of game is possible that employs all three viewing areas as part of the game play. Additionally, one or more of the screens may be used to offer casino specific features to the patron. Examples include booking hotel rooms, making restaurant reservations or ordering refreshments. Alternatively, additional game play opportunities or casino-wide bonus games may be presented on one of the screens.

Figure 2:
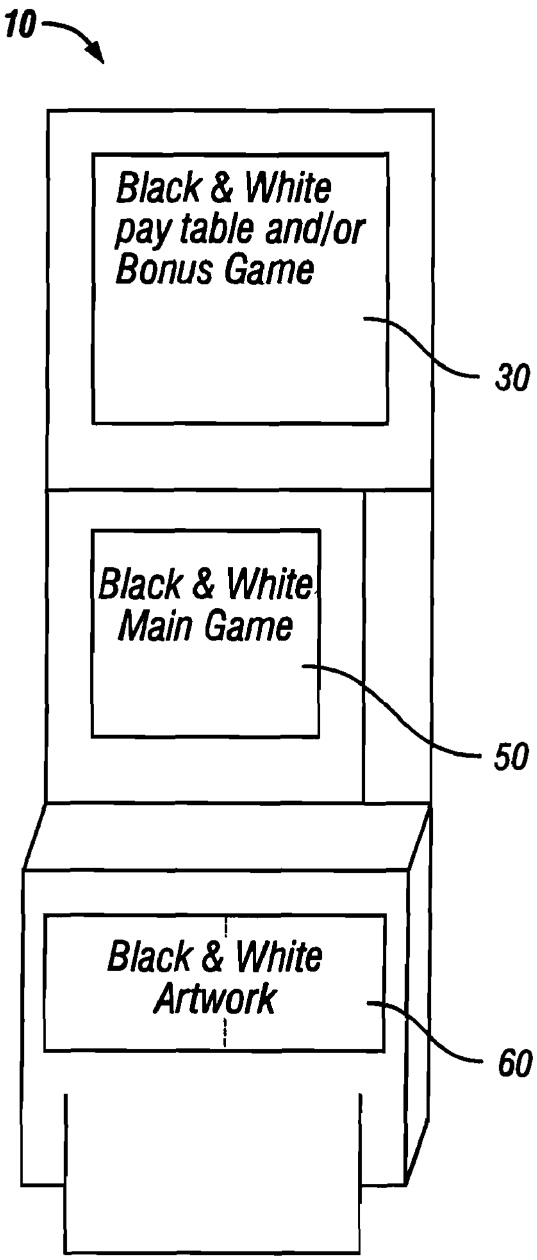
FIG. 2 is a front view of the gaming machine of FIG. 1, wherein the video displays of the gaming machine have been reconfigured.

FIG. 2 shows the gaming machine as illustrated in FIG. 1, but after the machine 10 has been reconfigured. In FIG. 1 the middle display area 50 shows, by way of example only, a Blazing 7's main game, the top display area 30 shows the pay tables associated with the Blazing 7's game, and the bottom display area 60 shows the artwork associated with the Blazing 7's game. In FIG. 2, the gaming machine 10 has been reconfigured so that the middle display area 50 shows a Black and White game, the top display area 30 shows the pay tables associated with Black and White game, and the bottom display area 60 shows artwork associated the Black and White game.

In an alternate embodiment, a set of mechanical reels is used instead of the middle display area 50. Nevertheless, the pay tables displayed in the top display area 30 and the artwork associated with bottom display 60 may be reconfigured. This is particularly effective if the mechanical reels employ generic symbols.

In accordance with the present invention, the changing of a game can be accomplished by downloading the new game and related software, including associated artwork, pay tables, graphics, sound, and the like, from either a CD-ROM, an intranet, the Internet, any attached network, or any other local storage medium contained within the game. As a result, this download changes the appearance and operation of the gaming machine. In other words, complete game themes can be downloaded to the gaming machine including, but not limited to game code, pay table graphics, and attractive graphics. Alternatively, multiple games may be stored on the local storage media of the gaming machine whereby one may be selected for use on the machine. However, it should be appreciated by one skilled in the art that games may be changed using any method known in the art. In addition, the potential game choices may actually may be intermittently displayed on the screens 30, 50, and 60 to attract players.

Thus, casino management can optimize play on the casino floor by rapidly reconfiguring games quickly and inexpensively. A casino can configure machines or the network to change games, paytables, minimum or maximum bets, and the like, at predetermined times, upon the occurrence of certain events, and/or the casino management can do so spontaneously. A plurality of machines may be reconfigured substantially simultaneously or the casino may choose to reconfigure only a single machine. For example, a casino may want to replace the games, associated pay tables and artwork on a plurality of machines with a more popular game, associated pay tables and artwork. Further, the casino may also program a plurality of machines to raise and lower the minimum bet required. For example, the minimum bet on machines may be $0.05 on weekdays and $5 on weekends. Or, if a busload of senior citizens, for example, unexpectedly enters the casino, the slot floor manager could quickly reconfigure some gaming machines, lowering the minimum bet to $0.05. Alternatively, a predetermined triggering event or trigger may cause the gaming machine, or certain sub-groupings of them, to reconfigure. For example, the gaming machine may lower or raise odds depending on the identity of the player (the network knows the identity of the player if the player inserts his or her game or club card into a card reader, as is known in the art) or the speed at which the game is being played, or the amount waged. Alternatively, a game change could take place at the request of a patron by the selection of a game title from a multi-game menu. This allows the player to sit at a machine in a specific location within the casino and to also play his game of choice.

Now, turning to the details of operation, the invention preferably utilizes a client server software architecture such that the client portion of the game can be separated from the server portion. In a standalone embodiment, both the client process and the server process will run within a gaming machine, but as two different processes. The stand-alone game is entirely contained within the gaming machine with all mechanical, electronic and algorithmic security, and authentication built in. This game can, essentially, be powered up and subsequently operate independently of any other system or network.

Figure 3:
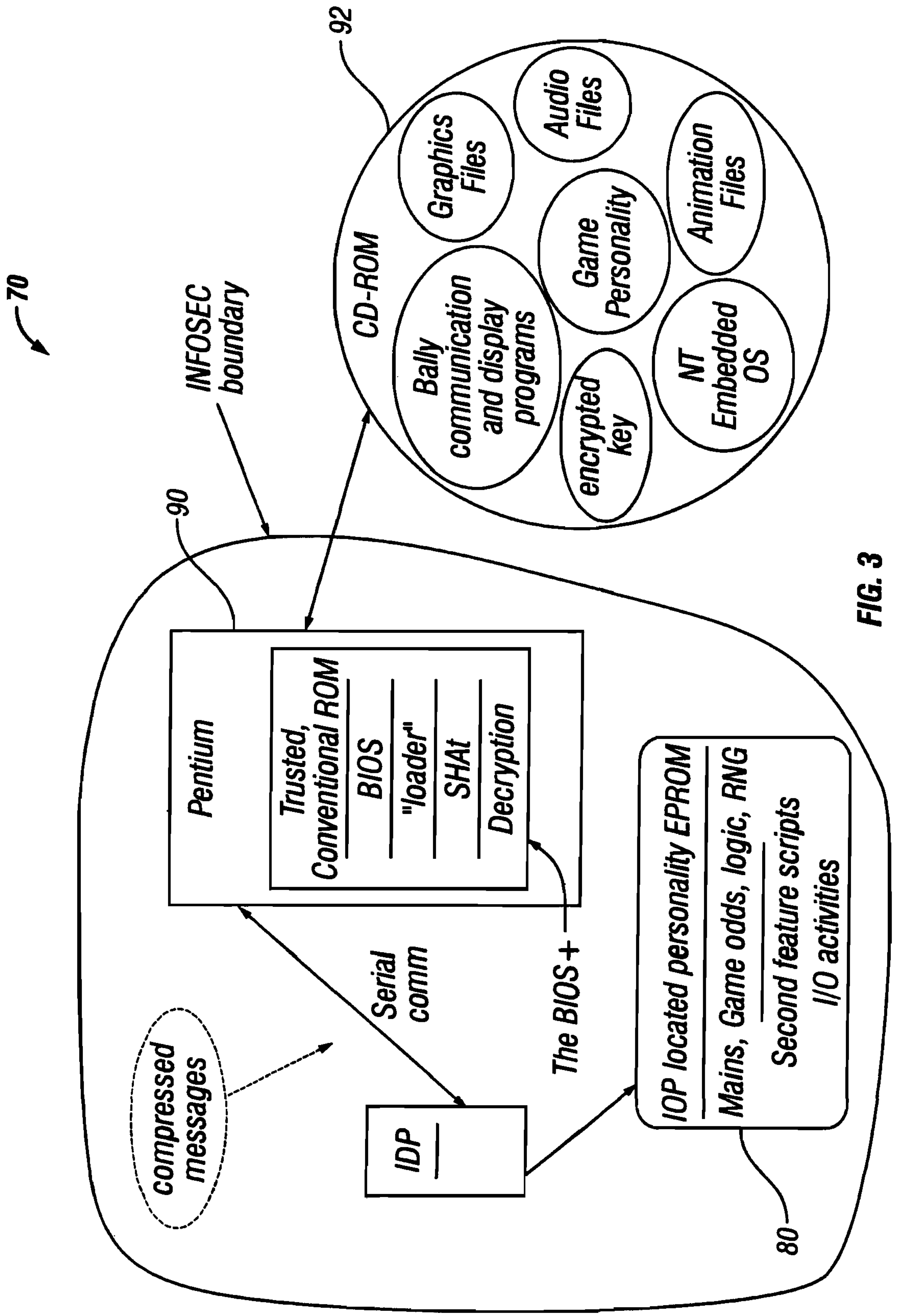
FIG. 3 is an illustration of a gaming platform that is used in a preferred embodiment of the present invention.
Figure 4:
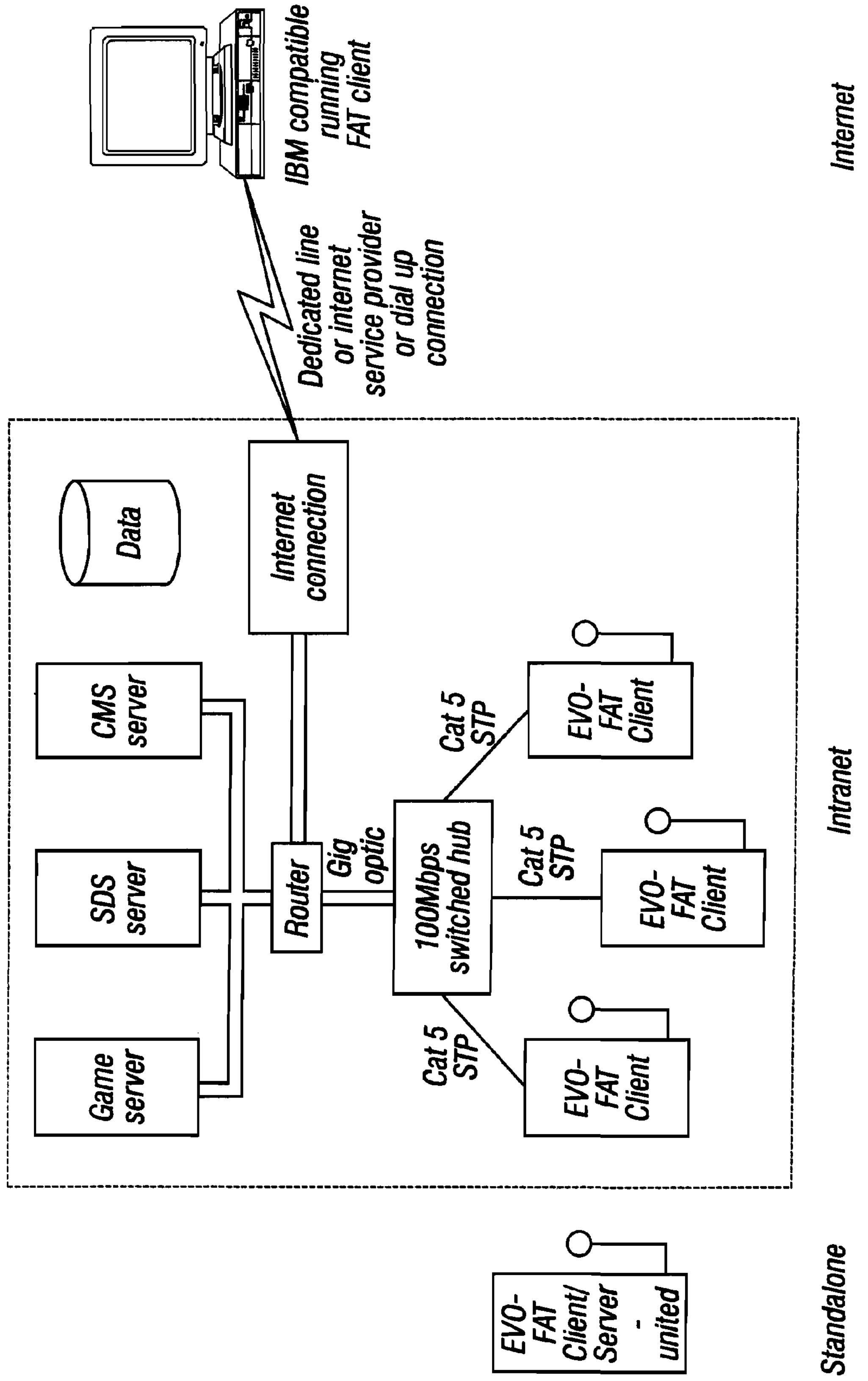
FIG. 4 is an illustration of various network configurations used in other preferred embodiments of the present invention.

Referring now to FIG. 3, a preferred stand-alone display and input system of the present invention uses a gaming platform 70 as its foundation and an "EPROM" and CD-ROM paired" design. The gaming platform 70 itself, is a highly advantageous system, that enables casino owners to draw off of the large library of casino game functions available in a traditional master processing unit (MPU) stand-alone platform, while adding the graphics and sound capabilities of a personal computer.

The game platform 70 uses two separate processors connected by a serial line. The first processor, referred to as the Input/Output processor 80 (TOP), contains no video or sound hardware. The IOP 80 contains all of the game logic, random number generators (RNG), host Input/Output (I/O), device I/O, and the core mains and personality EPROMs. The mains are the majority of code that runs the physical components of the gaming machine and the associated peripherals. The personality includes the odds, probabilities, winning symbols, and game rules. The functions contained on the EPROM are verifiable by traditional integrated circuit ("IC") testing techniques.

The second processor is a Pentium class PC-based processor 90 that has a CD-ROM read-only drive. The graphics, sound files, presentation software for at least one game, and basic operating system are stored on the CD-ROM. The Pentium processor 90 also has a customized BIOS chip, referred to as a BIOS+, which provides typical PC boot functions, as well as verification and decryption algorithms. The BIOS+ on the Pentium motherboard verifies the CD-ROM before the contents of the CD-ROM can be loaded into the Pentium RAM. In other preferred embodiments of the present invention, non-Pentium (but substantially equivalent functionality) processors are utilized including, by way of example only, and not by way of limitation, other non-Pentium Intel processors, Advanced Micro Devices (AMD) processors, and Motorola processors.

The IOP 80 is derived from a traditional MPU stand-alone platform, and provides access to the above-described library of casino game functions and drivers for casino games. However, the PC industry has a large number of tools that can create graphics and sound very efficiently. For this reason, the gaming platform 70 also includes a diskless, Pentium class processor 90 running an operating system that accepts PC sound and graphics content. The gaming platform 70 combines the strengths of a traditional stand-alone MPU game engine with the audio and visual capabilities that are available in the PC industry. Thus, the gaming platform 70 enables PC content to be used directly on a game platform vis-à-vis a Windows operating system environment (or other suitable graphic user interface (GUI)).

The IOP 80 in the gaming platform 70 differs from the traditional stand-alone MPU architecture in several ways. For example, in the gaming platform 70 the contents of the graphics chips are not located in the IOP 80 (as they are in the MPU), but rather are replaced by enhanced graphics, animations and sound files stored on the CD-ROM. The Pentium class processor 90 has presentation software for displaying the graphics and sound upon request from the game logic process within the IOP 80.

The intranet and standalone game cabinets include a hardware distinction. They employ the concept of "gadgets," i.e., generic device control units and specific device control units. These gadgets handle the "hard real time" processing tasks, freeing the Win32 (Microsoft) operating system to focus on user interface, graphics and sound tasks. A complete discussion of gadgets can be found in U.S. patent application Ser. No. 09/746,854, filed on Dec. 22, 2000 and incorporated herein by reference.

Referring now to security requirements, a primary objective of the security design is to satisfy all security requirements and gaming jurisdiction directives. Due to gaming compliance requirements, game code must be secure and authenticated. That is, a gaming device must be certain that the software that it is operating has been approved by the jurisdiction in which the game resides. The relevant directives require that the verification information and the verification code reside on a "conventional ROM device." However, pursuant to the proposed amendments to Gaming Regulations, a "conventional ROM device" may include FLASH memory components provided that they cannot be altered while installed in a gaming device. To satisfy these directives, the verification algorithm of the gaming platform 70 resides on a conventional ROM device, secured within the Pentium/IOP assembly. Security also includes physical cabinetry, locks and procedures.

The security architecture shown in FIG. 3 logically divides the gaming platform 70 security into critical components located inside or outside of an information security (INFOSEC) boundary. Within the secure portion of the INFOSEC Boundary, the gaming platform 70 includes the IOP 80 and the Pentium class processor 90, connected by a serial line. Preferably, the TOP 80 portion of the design is based on a Motorola 68332 and EPROMs. Preferably, on the Pentium 90 portion, the BIOS+ chip plugs into the Pentium motherboard and is physically secured within the Pentium assembly chassis. The conventional ROM device is socketed into the Pentium motherboard 90 and can be covered with a tamper-evident material. The CD-ROM assembly is logically outside of the INFOSEC boundary. The CD ROM assembly contains a commercial off-the-shelf CD read-only reader and the game CD-ROM.

The gaming platform 70 performs many verification processes during boot-up and game operation. Each game personality EPROM image on the IOP 80 is compared with those on the accompanying CD-ROM. The IOP board 80 initiates re-verification of the CD-ROM and informs the Pentium class processor 90 of any tilts that occur. Moreover, on the EPROM-controlled IOP 80, memory is continuously tested in order to immediately catch any changes. Further, an algorithm that originates on the BIOS+ conducts verification of all files on the CD-ROM.

The IOP 80 preferably uses VRTX as its operating system. VRTX is a reliable, real-time operating system with multitasking capabilities and has been used in the gaming environment for many years. The preferred operating system for the Pentium class motherboard is a multi-tasking operating system capable of running off non-writable media such as CD-ROM or EPROM in order to satisfy gaming jurisdictional requirements. Microsoft NT Embedded, XP Embedded, and LINUX are examples of such an operating system. The Pentium class motherboard 90 preferably uses Microsoft's Windows NT embedded. However, other operating systems could also be selected in other embodiments of the present invention, depending on many factors, including the desired graphic user interface (GUI).

NT embedded is particularly effective since many tools and developers are available for producing creative content on Windows-style platforms. Windows NT embedded differs from standard desktop operating systems, such as Windows 98 and Windows NT, which require a hard drive. These operating systems make use of a swap file to move programs and data between RAM and a hard disk. However, NT embedded eliminates the need for a swap file. NT embedded is customizable in this regard, allowing the swap file size to be set to zero so that no writable mass storage device is required. Further, NT embedded is preferably customized and compiled with only those components required to run a particular game or games. In other words, there are no additional drivers or services provided. Typically, there is no TCP/IP stack (or networking capabilities whatsoever). Preferably, this version of NT embedded is completely stand-alone and provides none of the traditional accessing "handles."

One preferred example of the media flow proceeds in the following sequence. (1) Verify the boot chip using traditional IC verification techniques. (2) The power comes up. The BIOS+ runs a self-verification on its own code. (3) The Pentium class processor 90 begins executing the BIOS+. (4) The BIOS+ comes up far enough to read the CD-ROM. Verification is run on the entire CD-ROM contents using a SHA-1 algorithm contained within the BIOS+. (5) A private key encrypted SHA-1 value, located in a secure location on the CD-ROM, is decrypted with the public key and algorithm contained on the BIOS+. (6) The results of the SHA-1, and now decrypted SHA-1 value, are compared. A match allows the operating system, program files, graphics, and audio to be loaded into the Pentium's RAM from the CD-ROM. (7) Since the IOP 80 can boot faster from the EPROM, the IOP waits to hear that the Pentium class processor has booted and loaded all needed software components into RAM. (8) The IOP 80 then checks the Pentium software levels using the same scheme used to match game driver levels to personality chip requirements. If the versions are acceptable, the IOP 80 confirms that the game personality contained in the EPROM matches the game personality on the CD ROM. (9) The game programs are loaded into IOP RAM and the game then proceeds, driven by the IOP RAM.

Thus, the game personality contained in EPROM on the IOP 80, and the game personality on the CD-ROM, are a matched set. If the two do not match, a fatal tilt results, rendering the game inoperable. This also means that the regulators must approve both the EPROM and the CD-ROM for every game released for distribution and approval. This process verifies the conventional ROM device and detects any substitution of the BIOS+. Both the SHA and DSA algorithms and key are held in a device that can be physically verified by the gaming control agents. For example, the EPROM or a FLASH chip may contain these pieces of information. Thus, the method builds layers of trust beginning with the physical flash chip. Once that chip has been verified, the field agent can trust the results of that chip testing other data. For example, it may go on to test the CD-ROM or EPROM's containing the game code.

In another preferred embodiment, the gaming platform 70 utilizes a "CD-ROM controlled" design. In this configuration, the game personality EPROM contents are placed on the CD-ROM only and not on the IOP. Once the Pentium class processor 90 boots and successfully verifies the contents of the CD ROM, a binary image of the game personality (which is located on the EPROM of the IOP 80 in the "paired" design EVO platform 70) is downloaded from the CD-ROM to a RAM chip located in the IOP 80. This RAM chip occupies the same socket as the game personality EPROM in the IOP 80 in the "paired" design gaming platform 70. Existing game driver level checks between the IOP 80 mains and the game personalities remain in place and are equally effective in this RAM-based personality design.

The "CD-ROM controlled" design provides the advantage of reducing the testing and distribution workload for gaming regulators because only a CD-ROM needs to be tested and released for new game content. Further, the "CD-ROM controlled" design also eases the need for compatibility checks between the IOP 80 and the Pentium class processor 90.

The intranet embodiments of the invention are important since they allow the casino operators to rapidly change the mix of the games on their floors with a minimum of time and effort. The intranet product also uses a client server software architecture. In some embodiments, the server is located within the gaming cabinet. In other embodiments, the server is located in the casino computer room or another secure location that may be remote to the casino. A server may handle multiple clients or a single client.

In a first intranet embodiment, the entire game is downloaded at a given time to the gaming cabinet. That is, the client and server process can be downloaded to the game and then, reside in the gaming machine, just as in the standalone case. Thus, for example, on Monday night at 2 a.m. the casino can download new games to some or all of the machines.

The server provides game outcomes to the client. In addition, the rules, accounting, random number generation and operation of the game are controlled by the server. Each game has its own random number generator within the server. Indeed, entirely different types of games, all being played simultaneously may share a single server. For example, there may be slot games, poker, roulette, and the like, all being played at once and sharing the same server. Each of these games will have an independent random number generator and its outcomes will have no relation to the other games currently underway even though the games all use the same server. In a preferred intranet embodiment, Microsoft Win2000 Server is the operating system used by the server.

Preferably, the client is "fat" meaning that it has all the graphics, sound, and some player response capabilities in order to keep the amount of messaging traffic on the network to a minimum. With 3000 machines in a typical casino, if the server has to send graphics and sound information for each play on every game, the network will become overwhelmed. Therefore, preferably, only a minimum amount of information is transferred between the client and the server. The messages between the client and the server are optimized for small size and minimal impact on the overall network bandwidth. If all the games on the floor need to communicate with the server, the data packets need to be small so that the traffic may be handled without delay.

The server and the client are preferably connected over a high-speed communication media. Examples are 10/100 BaseT Ethernet run over Cat 5 cable for the physical connection. Further, "long line" Ethernet can be run over older Cat 3 cable. The network might include RF portions that allow wireless connection from the slot floor ceiling to a slot carousel on the floor. Preferably, TCP/IP with HTTP and XML messaging handles the protocol.

In a preferred Internet embodiment, the server is located within a casino's backroom or elsewhere, as described for the intranet case, but the client will likely employ a browser such as Internet Explorer or Netscape Navigator. In addition, graphics, sound, and an executable file or applet will reside within the browser using Java1.3 and Macromedia Shockwave to provide streaming content delivery. Only user display functionality will be at the user PC. All game outcome information will reside in the server. In this way, new game content and data may be quickly downloaded to the gaming module quickly and securely.

In accordance with the present invention, games can be produced that seamlessly move from the stand-alone to the intranet to the Internet game platforms. In other words, the graphics and "play" of a game can be the same whether the player is using a stand-alone, intranet or Internet game platform. This improves the players experience since they will experience the same game play under all circumstances. This also improves the casino's operational efficiency since the server component can be common between the intranet and Internet products.

It should be noted that the content delivery mechanism, which is, the content creation engine, and tools may be but are not required to be, the same for the intranet, Internet and standalone versions as described herein. Not only are they typically the same, but they may use Microsoft Windows standard tools, methods and techniques. Since these are clearly dominant in the marketplace, game manufactures can take advantage of a large pool of people and tools to create new game content. This extends to others area of administrative efficiency. For example, gaming regulators can be mailed .bmp, .jpg and .avi files for approval of games. Further, since these are the actual files used in the games themselves, gaming regulators can approve the games more quickly as their desktop computers can readily read these files.

Today, there are many thousands of individual games, each separately communicating to the accounting server. Centralizing these into a single or a few game servers will have positive implications, such as improved reliability and data accuracy. In the intranet and Internet cases, where the games reside on a central server, there is only one central location that holds all the meters and accounting information. Thus, the "game server" can talk to the "accounting server" passing between these two systems all of the information required.

Although the invention has been described in language specific to computer structural features, methodological acts, and by computer readable media, it is to be understood that the invention defined in the appended claims is not necessarily limited to the specific structures, acts, or media described. Therefore, the specific structural features, acts and mediums are disclosed as exemplary embodiments implementing the claimed invention.

In addition to gaming machines having reconfigurable video displays, various embodiments of the invention are directed to reconfigurable gaming displays. In one embodiment, these reconfigurable gaming displays are the signs associated with one or more gaming machines. Generally, a reconfigurable gaming display includes at least one display screen that is in communication with a display control computer. The display control computer may readily alter game-specific graphics by changing the play lists, movies, and/or still graphics data presented on the gaming display. The gaming displays may be reconfigured automatically, in response to or upon the occurrence of a triggering event, in response to a command made by casino personnel, at the request of a player, or a combination thereof.

Furthermore, in some embodiments, the reconfigurable gaming displays are associated with reconfigurable gaming machines (i.e., gaming machines that are also capable of downloading new game theme content a game server). Accordingly, the game display and the gaming machines may be reconfigured (re-themed) with little or no human intervention required on the floor of the gaming establishment. Thus, in some embodiments, a casino management optimizes game play on the casino floor by quickly reconfiguring the gaming machines and gaming displays.

Figure 5:
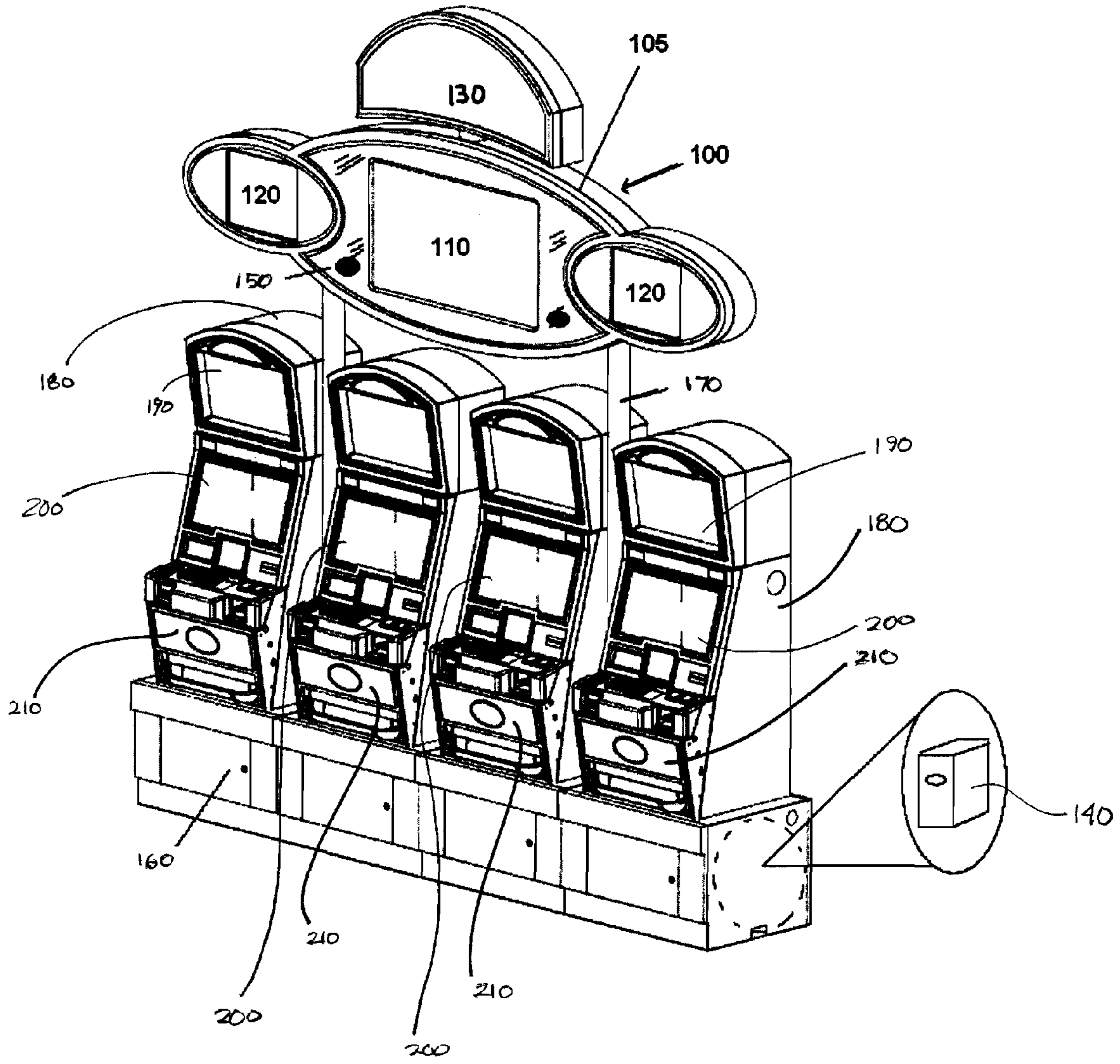
FIG. 5 is a perspective view of one embodiment of a gaming display.

Referring now to the drawings, wherein like reference numerals denote like or corresponding parts throughout the drawing figures and more particularly to FIG. 5, a gaming display 100, in accordance with one embodiment, is illustrated. The gaming display 100 includes a sign structure 105 that supports one or more display screens 110 and 120. As shown in FIG. 5, the sign structure 105 includes a primary display 110 and two secondary displays 120. In other embodiments, those skilled in the art will appreciate that the sign structure may include various numbers and combinations of the primary and secondary displays 110 and 120. According to one embodiment, the information presented on the primary display 110 is not the same as the information presented on the secondary displays 120. Alternatively, the displays 110 and 120 may present the same information. While FIG. 5 shows that the primary display 110 is larger than the secondary displays 120, the secondary displays may be the same size as the primary display.

Figure 6:
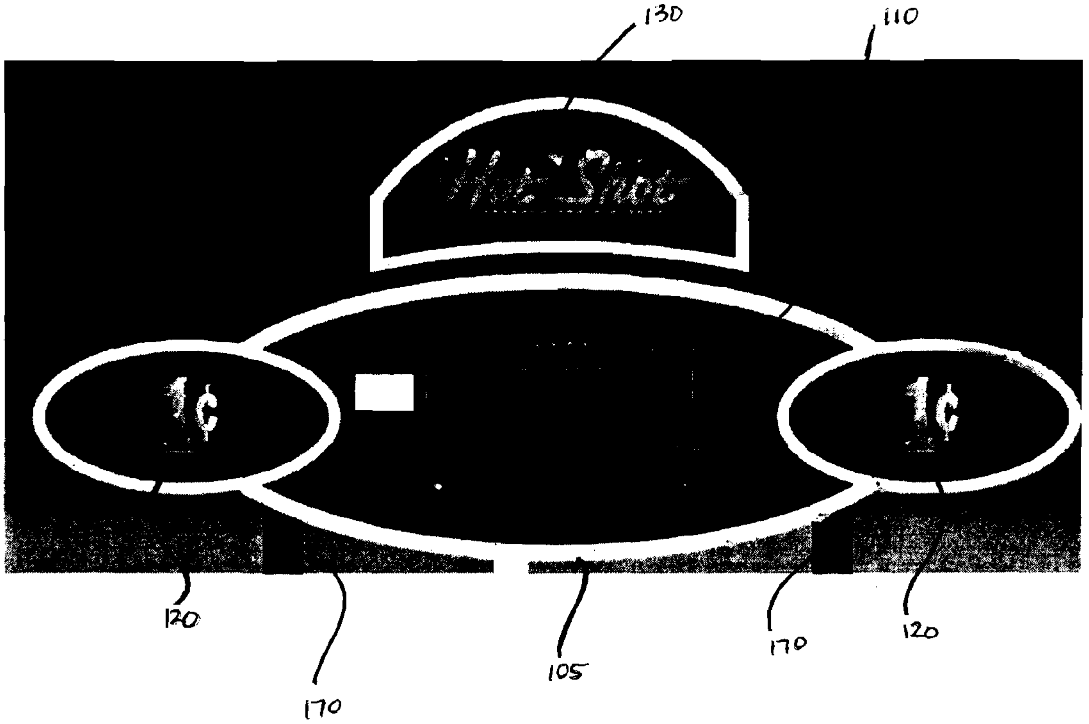
FIG. 6 is a view of one embodiment showing the types of presentations possible with a gaming display.

The primary and secondary displays 110 and 120 may play one or more play lists that define a sequence of movies, animations, or still frames to be displayed on each display. For example, as shown in FIG. 6, progressive information, progressive meters, animation to attract players, play information, and jackpot information may be displayed on a primary display 110 while the denomination of the gaming machines or other supporting information may be displayed on the secondary display 120. However, as those skilled in the art will appreciate, any type of reconfigurable information may be presented on the primary or secondary displays 110 and 120.

According to one embodiment, the displays 110 and 120 are flat panel displays including by way of example only, and not by way of limitation, liquid crystal, plasma, electroluminescent, vacuum fluorescent, field emission, LCOS (liquid crystal on silicon), and SXRD (Silicon Xtal Reflective display), DLP (Digital Light Projection), or any other type of panel display known or developed in the art. The flat panel displays may present information in a portrait, landscape, horizontal, or vertical configuration. Additionally, information presented on the flat panel displays may be in standard or widescreen dimensions. These flat panel displays 110 and 120 may use panel technologies to provide digital quality images including by way of example only, and not by way of limitation, SDTV, EDTV, or HDTV. As those skilled in the art will appreciate, the primary and/or secondary displays may also be Cathode Ray Tube (CRT) monitors, if a flat panel is not required. Furthermore, the display area may not necessarily be rectangular in shape. Rather, a frame or overlay may be placed over the display such that the active area of the display appears shaped (e.g., circular, ellipsoidal, or any polygonal or amorphous shape). Alternatively, the screen (not shown) may be a shaped screen and a front or rear projection LCD projector broadcasts graphics on the screen.

Referring back to FIG. 5, the gaming display 100 may also include a graphics area 130. In one embodiment, the graphics area 130 may be a display glass, plastic, or other rigid material presenting the name of a game, denomination of the game, and any associated graphics or images. The information presented on the display glass may be generic information (i.e., the information presented is applicable to a wide variety of games or games having a particular theme). Alternatively, the information presented in the graphics area may be game-specific thereby only requiring that the display glass be changed when the game theme is altered. In another embodiment, the graphics area 130 may be flat panel display capable of presenting the name of the game, any associated images or graphics, denomination of the associated gaming machines (e.g., 5¢, 25¢, $1, $5, or multi-denominational games), or any combination thereof. In an embodiment where the graphics area 130 is a flat panel display, the graphics area is in communication with the display control computer 140 so that the content of the graphics area may be reconfigured. In yet another embodiment, the game display (not shown) does not include a graphics area. In another embodiment, the graphics area 130 may appear to be shaped by placing an opaque overlay (not shown) over the rectangular active area of the flat panel display.

As shown in FIG. 5, the gaming display 100 may include one or more audio speakers 150 positioned within the sign structure 105. Alternatively, the speakers 150 may be concealed in game display 100. The speakers 150 may also be installed a gaming machine stand 160 or in any other location, or combination of locations, appropriate to a particular gaming display's installation. According to one embodiment, the audio speakers 150 are attached to the audio circuitry of computer 140 in any suitable mariner including wireless connections.

In other embodiments, the gaming display 100 may incorporate additional components such as lighting (e.g., neon, LED, or flashing lights) or an electronic banner display (not shown). According to one embodiment, the lighting components may be operatively coupled to the computer 140 so that the lighting patterns may be controlled and altered by the display control computer. Additionally, the electronic banner may be operatively coupled to the display control computer 140 so that the message(s) presented on the electronic banner may be readily altered. As those skilled in the art will appreciate, other gaming displays (not shown) may have fewer or additional components described herein.

As shown in FIG. 5, one or more legs 170 support the gaming display 100. The gaming display may be directly mounted to the floor or mounted to a gaming machine stand 160. Alternatively, the gaming display 100 may be mounted to a wall or suspended from the ceiling of the casino. As those skilled in the art will appreciate, the gaming display 100 is generally associated with one or more gaming machines 180. According to one configuration, the gaming display 100 is associated with gaming machines 180 configured in one or more rows. The gaming machines may also be configured in a back-to-back fashion. Alternatively, the gaming display 100 is associated with gaming machines 180 configured in a "carousel" arrangement (i.e., gaming machines are arranged in a ring, box, or other polygonal shape surrounding the gaming display).

In an optional embodiment, the gaming display 100 is associated with a bank of gaming machines 180 that include a plurality of in-game screens 190, 200, and 210. As shown in FIG. 5, the gaming machines 180 include three in-game screens 190, 200, and 210. In alternate embodiments, the gaming machines (not shown) may include one or two in-game screens. Referring now to FIG. 5, the gaming machines 180 are in communication with the display control computer 140 so that a portion of the information presented on the gaming display 100 may also be presented on the in-game screens 190, 200, and 210. Alternatively, the in-game display 190, 200, and 210 may present information that is complementary to the information presented on the gaming display 100. For example, animation or graphics regarding the name of the game or other information (e.g., jackpot amount) that is presented on one or more of the displays 110 and 120 of the game display 100 may also be presented on the in-game screens 190, 200, and 210. In another embodiment, one or more of the displays 190, 200, 210 may present the same or different graphics. In yet another embodiment, the top displays 190 from a plurality of gaming machines 100 may be linked together via the display control computer 140 such that the graphics or animation moves between the displays of an adjacent (or a bank of) gaming machines (e.g., simulating a race car or horse moving around a track by moving the race car or horse from display to display).

In various embodiments of the gaming display 100, a display control computer 140 is in communication with the various components of the gaming display. Optionally, the display control computer 140 may also be in communication with the in-game display screens 190, 200, and 210 of the gaming machines 180. In this embodiment, the displays 190, 200, and 210 associated with the gaming machines 180 and the game display 100 may readily be changed. In these various embodiments, the display control computer 140 may be concealed in a gaming machine stand 180. In another embodiment, the processing logic of the display control computer 140 may be located within one or more gaming machines 180. Alternatively, the display control computer 140 may be in a location remote from the game display 100 and gaming machines 180. In another embodiment, the display control computer 140 may control a plurality of game displays 100 that present information related to the same games or different games. In yet another embodiment, the display control computer 140 is housed in the sign structure 105.

As shown in FIG. 5, the sign structure 105 may be a single-sided structure including one or more displays 110 and 120 and/or one or more graphics areas 130. Accordingly, the single-sided sign structure 105 may be used for a bank of gaming machines 180 positioned against a wall. In another embodiment, the sign structure (not shown) may be a double-sided structure having one or more displays 110, 120 and/or a graphics area 130 positioned on each side of the sign structure. In yet another embodiment, the sign structure (not shown) includes three or more faces (i.e., sides). For example, the sign structure (not shown) may be a 3-sided structure associated with a triangular-shaped bank of gaming machines. In another embodiment, the sign structure (not shown) is a circular structure having one or more displays 110, 120 mounted about the circumference of the sign structure. Optionally, the circular sign structure and other types sign structures may be rotatable structures. Accordingly, these rotatable structures include the requisite components (motors, gears, transmissions, and the like) to rotate the sign structures.

As those skilled in the art will appreciate, the multiple-faced sign structures may be used in open areas of a gaming establishment. In some embodiments, the display screens 110 and 120 present the same content on all faces of the gaming display. Alternatively, the display screens 110 and 120 present different game themes on each of the faces of the game display according to the game theme of the gaming machines 180 positioned below each face of the game display. In another embodiment, the display screens 110 and 120 may be linked together such that graphics or animation moves from one display screen to another display screen to simulate movement of an image across the sign 105.

According to the various embodiments of the game display 100, the display computer 140 uses PC architecture to present the information on the displays 110 and 120. In some embodiments, Microsoft Windows NT® or XP® operating systems are used to manage and control the information displayed on the displays 110 and 120. The Microsoft® operating system recognizes multiple displays 110 and 120 thereby allowing for differing graphics to be shown on the displays. Alternatively, other operating systems such as Linux® are used to control information presented on the displays 110 and 120.

In other embodiments, the display computer 140 includes video cards or other multimedia cards to support and control the information displayed on a plurality of displays. For example, a PCI plug-in card having multiple output drives may be used to support multiple screens simultaneously. One video output drives the primary screen and a second video output drives the secondary display. In another embodiment, multi-head video cards are used with the display computer 140 to display differing images and/or information on the displays 110 and 120. For example, a dual-head video card such as, but not limited to, a NVIDIA® GeForce™ video adaptor is used to present differing images on the displays 110 and 120 of the gaming display 100. Alternatively, a single-head video adaptor in a single control computer with an on-board video adaptor is used to present differing images and/or information on one or more display screens. As those skilled in the art will appreciate, other configurations of the display computer 140 may be used to present differing images, movies, and/or other gaming and non-gaming information on one or more display screens 110 and 120 of the game display 100.

Additionally, Open Graphics Libraries (OGL) or other graphics libraries may be used with the display control computer 140. The OGL provides features such as, but not limited to, color blending, alpha channels, dynamic resizing, and three-dimensional presentations. For example, the OGL is used to facilitate the animation of the incrementing progressive meter numbers. The OGL also reduces the processor burden on the main CPU by reducing the resource requirements of the video adaptor processor and the video memory. With respect to animations, videos, and/or movies, rendering programs including by way of example, but not by way of limitation, QuickTime may be used.

In another embodiment, multi-threaded software applications are used to present information on the game displays 110 and 120. The multi-threaded applications may have one or more separate threads for different types of information, thereby optimizing CPU utilization. In one embodiment, the software includes by way of example, but not of limitation, an application thread, OGL thread, movie thread, and a serial communication thread.

In this embodiment, the application thread may be used for the user interface for the display control computer 140 and/or the master controller. The OGL thread is used to create and display received data. For example, the display control computer 140 receives progressive value data, gaming machine numbers, and jackpot amounts, and the OGL thread will create and display this information in a defined area of the display screens 110 and 120.

In one embodiment, the movie thread is responsible for loading and cycling through movie play lists. For example, the movie thread plays movies regarding jackpot trigger announcements. Additionally, the movie thread provides QuickTime® CPU cycles for playing movies in multiple windows. Optionally, other threads "register" windows (i.e., locations on the display screens) with the movie thread in order to have QuickTime® initialized in these "registered" windows.

In another embodiment, the serial communication thread receives progressive data from a progressive controller, updates progressive meter amounts, determines if any jackpots have been won, and sends win messages, when applicable, to the application thread. As those skilled in the art will appreciate, the serial communication thread may be substituted with TCP/IP or UDP threads depending on the type of progressive controller used to manage the progressive game.

Figure 7:
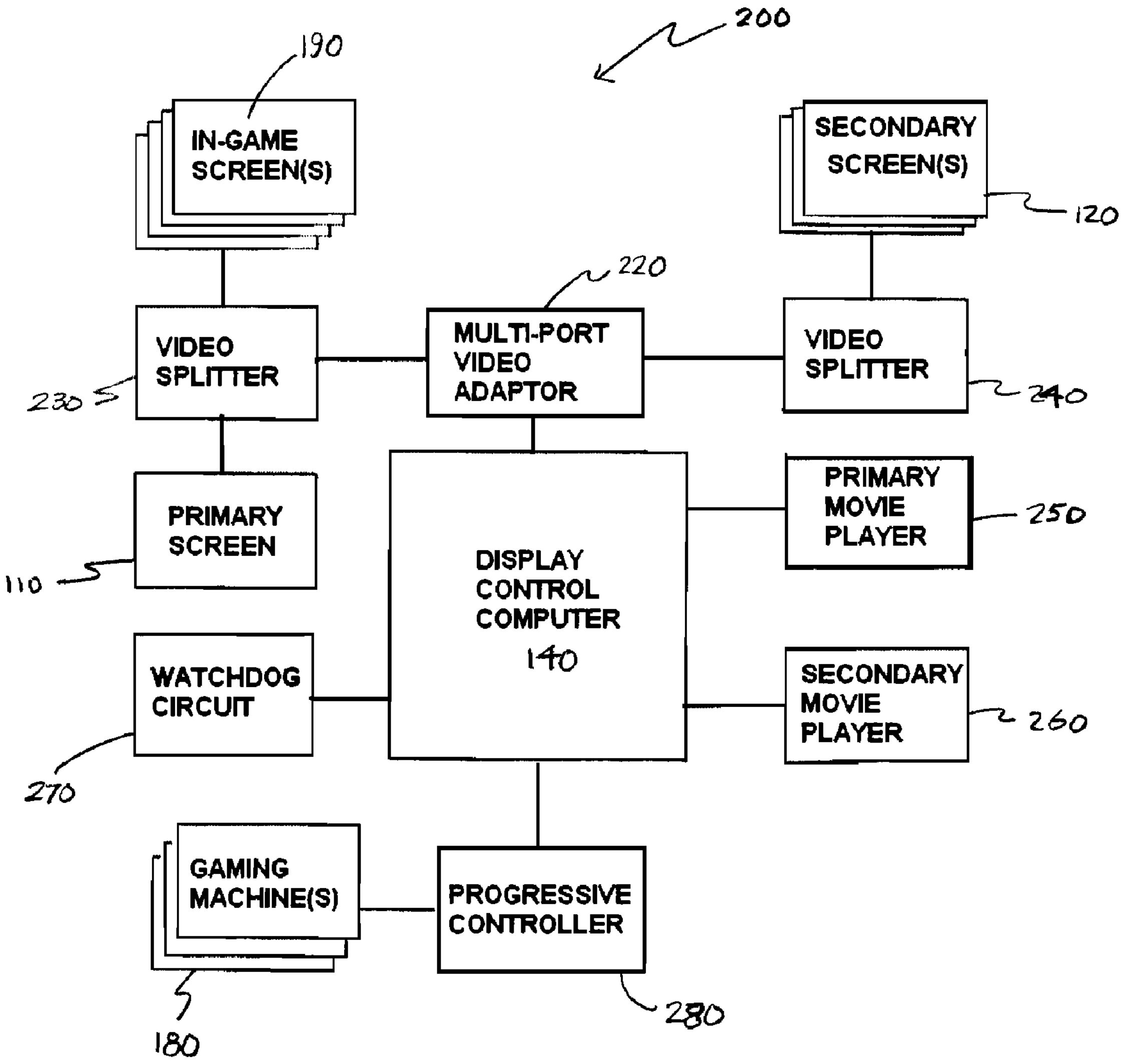
FIG. 7 is a block diagram of a system suitable for operating one embodiment of a gaming display.

Referring now to FIG. 7, one embodiment of a system 200 for operating a gaming display 100 is shown. In this system 200, a display control computer 140 is in communication with the primary screen 110 and two or more secondary screens 120 of the gaming display 100. As shown in FIG. 7, the primary and secondary screens 110 and 120 are connected to the display control computer 140 via a multi-port video adapter 220. The primary screen output of the multi-port video adapter 220 is connected to the input port of a video splitter 230, and the secondary screen output of the multi-port video adapter is connected to the input port of a second video splitter 240. The video splitters 230 and 240 boost and duplicate the signal from the primary and secondary screen outputs to one or more output sources such as, but not limited to, the in-game screens 190, 200, and 210 or one or more secondary display screens 120. Each in-game screen 190, 200, and 210 connects to the output ports of video splitter 230 directly or through extension cables. Additionally, each secondary display screen 120 connects to the output ports of the second video splitter 240 directly or through extension cables.

In one embodiment, the video splitters 230 and 240 are OmniView™ ExpandView™ Series 8-Port Video Splitters sold by Belkin® Corporation. These video splitters may display a video or image on up to eight screens from a single unit, and up to thirty-two screens by way of daisy-chaining multiple splitters. Screens connected to the ExpandView™ Series video splitter can be extended as far as 65 meters (213 feet). In another embodiment, Y-adapters may be used to replicate the presentation from the primary or secondary screen to a video display source (e.g., in-game screens). In yet another embodiment, each output component (e.g., primary display screen, secondary display screen, and in-game screens) is directly coupled to the output ports of the multi-port video adapter.

As shown in FIG. 7, the display control computer 140 includes a primary movie player 250 and a secondary movie player 260. In other game display systems, the display control computer 140 may have one or more movie players as well as other software or components that facilitate the presentation of animation, movies, images, text, or the like on the display screens.

In another embodiment, the display control computer 140 includes a watchdog circuit 270 to monitor the software application and force a power reset of display control computer if the watchdog circuit is not serviced properly. For example, resetting the power will reboot the computer and subsequently restart the software application. A watchdog circuit 270 may be implemented using any means known in the art such as, but not limited to, a PCI-style card. However, as those skilled in the art will appreciate, the watchdog circuit may not be included in the game display system.

In another embodiment, the display control computer 140 may be configured to communicate with one or more progressive controllers, individually or simultaneously, using one or more protocols such as, but not limited to, Bally-GASS2, Bally Sign Interface (BSI), Mikohn serial interface, the Paltronics protocol, or any progressive controller protocol known in the art. In yet another embodiment, the display control computer may be configured to operate as a progressive controller thereby allowing for direct communication with the gaming machines in terms of managing the reconfigurable displays and the progressive game.

Alternatively, as shown in FIG. 7, the display control computer 140 is also in communication with a progressive controller 280, which in turn, is in communication with one or more gaming machines 180. Generally, the progressive controller 280 receives the game play information (e.g., coin-in and jackpot win indications) from the gaming machines 180, and the progressive controller adjusts the value of progressive pools and/or awards progressive prizes. The display control computer 140 receives progressive information from progressive controller 280, and the display control computer then provides this progressive information to the primary movie player 250. The primary movie player 250 then combines the progressive information with graphics from the current presentation frame in its play list to create a screen presentation for display on primary screen 110.

While various examples of a gaming display for progressive gaming systems are disclosed herein, those skilled in the art will appreciate that the gaming display may be used for other types of gaming systems. For example, the primary and/or secondary screens of the gaming display may be used to facilitate central system-based game applications or a group play system.

Figure 8:
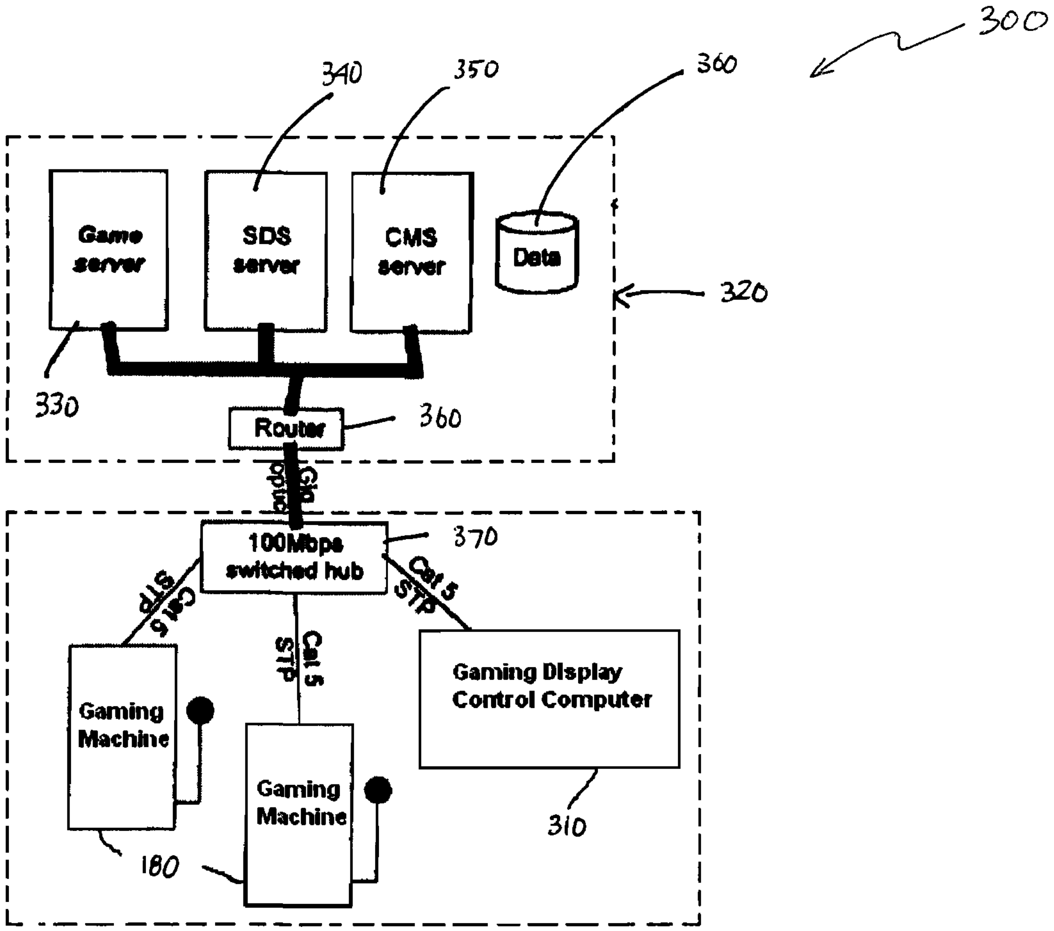
FIG. 8 is an illustration of a network configuration.

Referring now to FIG. 8, another system 300 for operating a reconfigurable gaming display 100 is shown. In this system 300, the display control computer 310 is connected to a network 320. As shown in FIG. 8, the network 320 includes a game server 330, a slot data system (SDS) server 340, a casino management system (CMS) server 350, and a data store 360. These servers 330, 340, 350, and the data store 360 are in communication with the gaming display control computer 310 via one or more routers 360 and/or one or more switched hubs 370. As those skilled in the art will appreciate, the network 320 may not have all these components or may have other components in addition to, or in lieu of, those components mentioned herein. In one embodiment of this system 300, a portion or all of the software used by the display control computer 310 may be downloaded from a network server (e.g., game server) to a memory store (e.g., a hard drive or flash memory) located in or associated with the display control computer 310.

In the embodiment shown in FIG. 8, the display control computer 310 is located on the casino floor. Alternatively, the display control computer 310 may be located in a centralized location (that is not on the casino floor). The display control computer 310 may control the applications running on the displays 100, monitor the meter amounts presented on the displays, and download content to the displays from a centralized location.

In another embodiment, a centralized workstation (not shown) may be associated with the network 320 and in communication with the display control computers 310 that are located on the casino floor. The centralized workstation may control the applications running on the displays 100, monitor the meter amounts presented on the displays, and download content to the displays by accessing the display control computer 310 which, in turn, is in communication with the displays. According to one embodiment, the centralized workstation may be able to remotely access and control each display control computer 310 and/or each reconfigurable display 100 via an Internet connection. As those skilled in the art will appreciate, software applications offered by LogMeln, Inc. may be used to remotely access the display control computers 310 in remote locations. As a result, for example, a centralized workstation in Las Vegas may control displays that are located in casinos located in Detroit, Macau, Reno, or the like.

Figure 9:
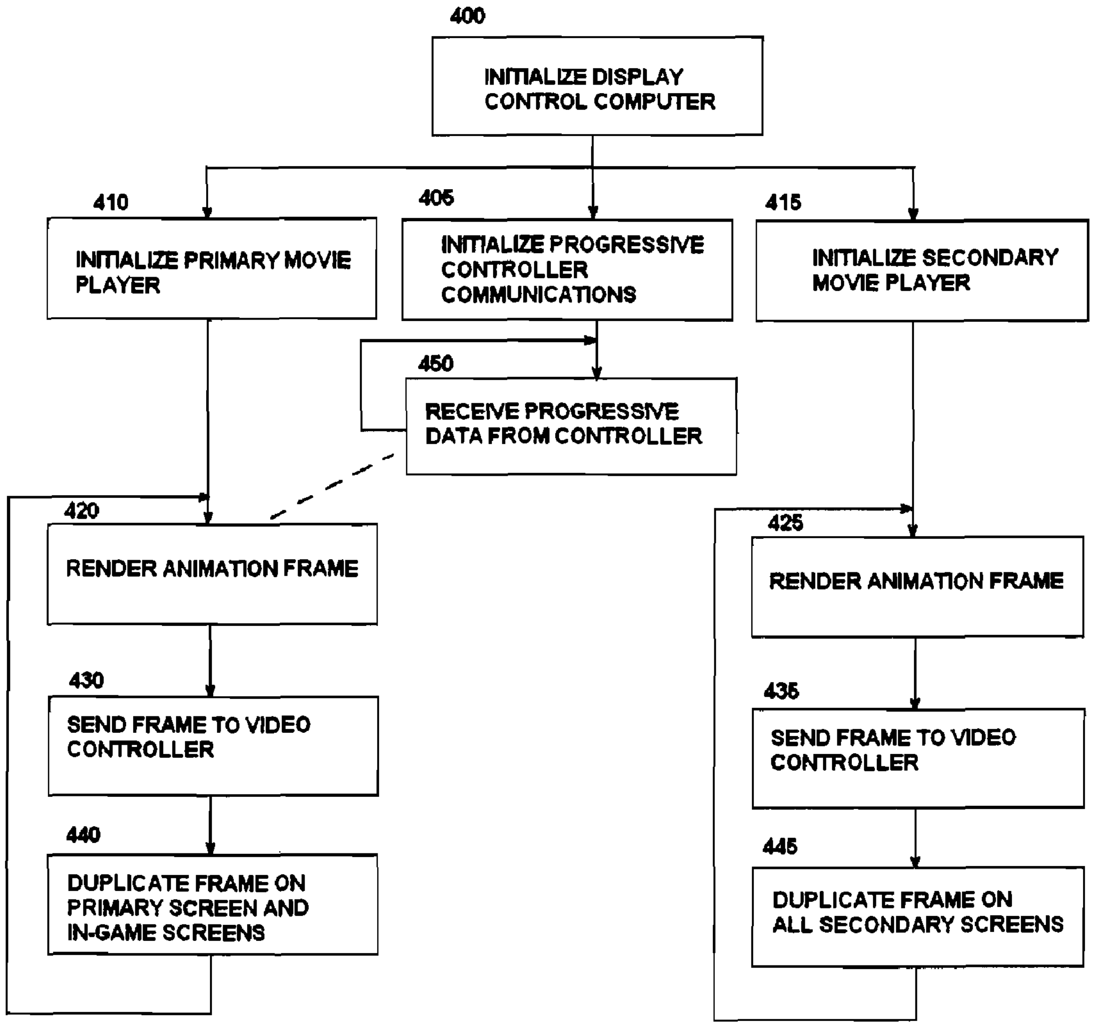
FIG. 9 is a functional block diagram depicting the acts associated with using a multi-screen gaming display driven by a single control computer.

Turning now to FIG. 9, a logical flow diagram illustrates one method of controlling and managing a reconfigurable game display. Generally, the display control computer is initialized and one or more processing threads are created. As shown in block 400, processing threads for the primary movie player, secondary movie player, and progressive controller communications are created. As those skilled in the art will appreciate, additional threads may be created based upon the configuration or features of the gaming display.

In block 410, the primary movie player is initialized by loading the script file associated with its animations. Processing in this thread continues at block 420 where the primary movie player renders an animation frame that may include a current basic animation frame and the current progressive meter values. The animation frame is then sent to the multi-screen video interface circuitry. In block 430, the video interface circuitry determines whether the current animation frame should be routed to the primary screen video output. If appropriate, the current frame is sent to a primary video splitter, which receives and sends the current frame to one or more primary game displays and in-game screens at block 440. Optionally, the current frame may only be sent to the primary game display or only the in-game displays. Processing in this thread loops back to block 420 for rendering of the next animation frame.

Similarly, the secondary movie player is initialized by loading the script file associated with its animations at block 415. Processing in this thread continues at block 425 where the secondary movie player renders an animation frame and sends it to the multi-screen video interface circuitry. In block 435, the video interface circuitry determines whether the current frame should be routed to the secondary screen video output. If appropriate, the current frame is sent to the secondary video splitter (e.g., a Y-adapter), which receives and sends the screen data to one or more secondary displays at block 445. Processing in this thread loops back to block 425 for the rendering of the next animation frame.

At block 405, the display control computer establishes a processing thread for communications with one or more progressive controllers. At block 450, the progressive communication thread is monitored for data from the progressive controller. Once the thread receives in-coming progressive data, the data is sent to the primary movie player thread at block 420. Alternatively, the in-coming progressive data may be sent to the secondary movie player thread at 425. The progressive data may then be processed and presented on one or more of the display screens.

Once the display control computer has been configured and the various application threads have been established, reconfiguration of the game display may take place upon the occurrence of a triggering event or by a command made by casino personnel. The triggering event may be a specific date, date range, time, time range, or a certain predetermined event. Additionally, the triggering event may be player-specific. For example, the gaming display 100 or the in-game display may take on a golden hue if a “Gold” level player is playing a particular gaming machine. Alternatively, a game change could take place at the request of a patron by the selection of a game title from a multi-game menu.

According to one method, the gaming display may be reconfigured by downloading the new game theme and related software (including associated artwork, pay tables, movies, still graphics, sound, play lists and the like) from a remote location including by way of example, but not by way of limitation, an associated network, virtual private network, a network server, an intranet, or the Internet. In one method, the downloaded or uploaded content is authenticated to ensure that the content has not been tampered by the authentication methods disclosed in U.S. patent application Ser. No. 10/836,849, titled “Verification System and Method,” filed Apr. 30, 2004, which is hereby expressly incorporated by reference. As those skilled in the art will appreciate, other authentication methods known or used in the art may be used to verify the downloaded content. Alternatively, the game theme and related software may be contained on the hard drive of the gaming display control computer, a CD-ROM, flash memory, or other associated storage medium. As a result, the appearance and operation of the gaming display may be altered once the new software is executed on the gaming display control computer. Accordingly, the still graphics, denomination movies, progressive meter movies, pay table graphics, sound effects, music, and player attraction graphics may be reconfigured.

The various embodiments described above are provided by way of illustration only and should not be construed to limit the claimed invention. Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed is:

1. A gaming system, comprising:

one or more gaming machines including three reconfigurable video screens, wherein a first video screen presents a first game, the second video screen presents a pay table associated with the first game, and the third video screen presenting artwork associated with the first game, and wherein the gaming machines are remotely reconfigurable to display a second game on the three reconfigurable video screens in response to receiving a reconfiguration command and downloading the second game from a server via a network, enabling the second game to be presented on the first video screen, the pay table associated with the second game to be displayed on the second video screen, and the artwork associated with the second game to be displayed on the third video screen;

a remotely configurable display sign separate and distinct from the gaming machines, wherein the remotely configurable display sign presents information associated with the game being presented on the gaming machine, wherein the configurable display sign includes one or more reconfigurable video screens, and wherein the configurable display sign enables downloadable information to be received and presented the downloadable information on the reconfigurable video screens; and a remotely-located processor in communication with the gaming machines and the configurable display sign, wherein the processor enables alteration of the content displayed on one or more of the reconfigurable video screens on the gaming machines and the remotely configurable display sign.

2. The gaming system of claim 1, wherein the remotely configurable display sign further comprises a first surface and a second surface opposite the first surface, and wherein the video screens are positioned on the first and second surfaces of the remotely configurable display sign.

3. The gaming system of claim 2, wherein the video screens on the first surface of the configurable sign present information relating to a first game theme, wherein the video screens on the second surface of the configurable sign present information relating to a second game theme, and wherein the first game theme is not the same as the second game theme.

4. The gaming system of claim 1, wherein the processor is in communication with a system host.

5. A gaming system, comprising:

a remotely configurable display sign, wherein the configurable display sign includes one or more reconfigurable video screens, and wherein the configurable display sign receives and presents downloadable information on the reconfigurable video screens;

one or more gaming machines associated with the remotely configurable display sign, wherein the gaming machines include three or more remotely reconfigurable video screens, wherein the reconfigurable video screens and the remotely configurable display sign display information relating to a common game theme, and wherein the remotely configurable display sign is separate and distinct from the associated gaming machines, wherein a first video screen, a second video screen, a the third video screen display a first game, information relating to the first game, and artwork related to the first game, and wherein the gaming machines are reconfigurable to display a second game on the three video screens in response to receiving a reconfiguration command and downloading the second game from a server via a network so that the reconfigured first video screen, the reconfigured second video screen, and the reconfigured third video screen display the second game, information relating to the second game, and artwork related to the second game; and a system host in communication with the configurable display sign, wherein the system host enables alteration of the content displayed on the configurable display sign.

6. The gaming system of claim 5, wherein the remotely configurable display sign further comprises a remotely configurable graphics area.

7. The gaming system of claim 5, wherein at least one video display of the gaming machine presents video content for a game of chance and at least one video display of the gaming machine presents game information, and wherein the gaming machine enables downloadable information to be received and presented on the reconfigurable video screens.

8. The gaming system of claim 5, wherein the gaming machine further comprises a plurality of mechanical reels presenting a primary game.

9. The gaming system of claim 5, wherein the system host is in communication with the gaming machines, wherein the system host enables alteration of the content displayed on one or more of the gaming machines.

10. The gaming system of claim 5, wherein the configurable display sign further comprises a first surface and an opposite second surface, wherein the video screens are positioned on the first and second surfaces of the configurable display sign.

11. The gaming system of claim 1, wherein the video screens are located at a middle display area that provides a traditional game display, a bottom display area that is associated with a belly glass, and top display area that is associated with a top glass.

* * * * *

UNITED STATES PATENT AND TRADEMARK OFFICE

CERTIFICATE OF CORRECTION

PATENT NO. : 8,167,723 B1
APPLICATION NO. : 11/463793
DATED : May 1, 2012
INVENTOR(S) : Hill et al.

It is certified that error appears in the above-identified patent and that said Letters Patent is hereby corrected as shown below:

ON THE TITLE PAGE:
Item (57), Abstract: line 1, Delete “a” after “having”

IN THE SPECIFICATIONS:
Column 2, In line 35, Change “chose” to --choose--

Column 3, In line 59, Delete the word “a” after “having”

Column 4, In line 20, Change “In yet” to --Yet--

Column 5, In line 62, Add --a-- after “with”

Column 8, In line 19, Change “TOP” to --IOP--

Column 10, In line 61, Change “players” to --players’--

Column 11, In line 47, Add --from-- after “content”

Column 12, In line 51, Add --a-- after “be”

Column 12, In line 67, Add --the-- after “in”

Column 13, In line 1, Add --in-- after “installed”

Column 13, In line 4, Add --the-- after “of”

Column 16, In line 63, Add --the-- after “on”

Signed and Sealed this
Sixteenth Day of April, 2013

Teresa Stanek Rea
*Acting Director of the United States Patent and Trademark Office*